US010877733B2

(12) United States Patent
Gao

(10) Patent No.: US 10,877,733 B2
(45) Date of Patent: Dec. 29, 2020

(54) SEGMENT DIVIDER, SEGMENT DIVISION OPERATION METHOD, AND ELECTRONIC DEVICE

(71) Applicant: BOE TECHNOLOGY GROUP CO., LTD., Beijing (CN)

(72) Inventor: Yang Gao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/993,906

(22) Filed: May 31, 2018

(65) Prior Publication Data

US 2019/0146756 A1 May 16, 2019

(30) Foreign Application Priority Data

Nov. 14, 2017 (CN) .......................... 2017 1 1123443

(51) Int. Cl.
*G06F 7/535* (2006.01)
*G06F 7/72* (2006.01)
*G06F 7/02* (2006.01)

(52) U.S. Cl.
CPC .................. *G06F 7/72* (2013.01); *G06F 7/02* (2013.01); *G06F 7/535* (2013.01)

(58) Field of Classification Search
CPC .................................. G06F 7/52; G06F 7/535
See application file for complete search history.

(56) References Cited

U.S. PATENT DOCUMENTS 5,065,352 A * 11/1991 Nakano ................... G06F 7/535
708/654
5,097,436 A * 3/1992 Zurawski ................ G06F 7/508
708/711

(Continued)

FOREIGN PATENT DOCUMENTS

CN 100543666 C 9/2009
CN 102063284 A 5/2011

(Continued)

OTHER PUBLICATIONS

First Office Action for Chinese Patent Application No. 201711123443.X dated Oct. 9, 2019.

*Primary Examiner* — Chuong D Ngo
(74) *Attorney, Agent, or Firm* — Calfee, Halter & Griswold LLP

(57) ABSTRACT

A segment divider, a segment division operation method, and an electronic device are disclosed, relating to the technical field of digital signal processing. The divider includes: a first shift register circuit; a second shift register circuit; a calculation circuit configured to compare data in first registers and data in second registers according to the cascade order, to perform a preset operation and generate an operation result; a third shift register circuit configured to receive and register the operation result bit by bit; then a shift control circuit configured to control the first shift register circuit and the third shift register circuit to perform a shift operation; a counting circuit configured to accumulate the number of shift operations after each shift operation, and send an output signal to finish the operation or send a calculation signal to continue the operation; and an output circuit configured to output a target result.

13 Claims, 5 Drawing Sheets

(56) References Cited

U.S. PATENT DOCUMENTS

| | | | | |
|---|---|---|---|---|
| 5,130,944 | A | * 7/1992 | Chung | G06F 7/535 |
| | | | | 708/655 |
| 5,155,699 | A | * 10/1992 | Chung | G06F 7/535 |
| | | | | 708/655 |
| 2005/0278407 | A1 | 12/2005 | Tang | |
| 2012/0150932 | A1 | * 6/2012 | Tanaka | G06F 7/535 |
| | | | | 708/209 |
| 2013/0275484 | A1 | * 10/2013 | Osano | G06F 7/535 |
| | | | | 708/653 |
| 2014/0046996 | A1 | * 2/2014 | Rumyantsev | G06F 7/52 |
| | | | | 708/620 |
| 2016/0062673 | A1 | * 3/2016 | Tiwari | G06F 12/02 |
| | | | | 711/154 |

FOREIGN PATENT DOCUMENTS

| | | |
|---|---|---|
| CN | 103914276 A | 7/2014 |
| CN | 105955706 A | 9/2016 |
| CN | 106354473 A | 1/2017 |

\* cited by examiner

SEGMENT DIVIDER, SEGMENT DIVISION OPERATION METHOD, AND ELECTRONIC DEVICE

CROSS REFERENCE TO RELATED APPLICATIONS

This application claims the benefit of China Patent Application No. 201711123443.X filed with the China Patent Office on Nov. 14, 2017, the entire content of which is hereby incorporated by reference.

TECHNICAL FIELD

The present disclosure relates to the field of digital signal processing technology, and in particular, to a segment divider, a segment division operation method, and an electronic device.

BACKGROUND

A divider is one of the most commonly used circuits in an arithmetic operation circuit, and the division operation is more difficult to achieve than the subtraction operation and the multiplication operation.

SUMMARY

Embodiments of the present disclosure relate to a segment divider, a segment division operation method and an electronic device.

Other features and advantages of the disclosure will be made apparent from the following detailed description, or may be learned by practice of the disclosure.

According to one aspect of the present disclosure, there is provided a segment divider, including:

a first shift register circuit including a plurality of cascaded first registers and configured to receive dividend data bit by bit;

a second shift register circuit including a plurality of cascaded second registers and configured to receive and store divisor data;

a calculation circuit including a plurality of cascaded calculators, the calculator being configured to compare the registered data in the first register and the registered data in the second register according to the cascade order, to perform a preset operation and generate an operation result according the comparison result;

a third shift register circuit including a plurality of cascaded third registers and configured to receive and register the operation result bit by bit;

a shift control circuit configured to control the first shift register circuit and the third shift register circuit to perform a shift operation after each operation result is generated;

a counting circuit configured to accumulate the number of shift operations after each shift operation, and send an output signal to the output circuit to finish the operation when the accumulation result equals a target number of bits, and when the accumulation result is not equal to the target number of bits, send a calculation signal to the calculation circuit to continue the operation; and the output circuit configured to output a target result when receiving the output signal, wherein the target result includes a quotient, and the quotient is the data registered in the third registers cascaded in the third shift register circuit when the output signal is received.

In an exemplary embodiment of the present disclosure, when the target number of bits is equal to the number of bits of the dividend data, the target result further includes a remainder, and the remainder is registered data i in the first shift register circuit when the output signal is received.

In an exemplary embodiment of the present disclosure, wherein numbers of the first registers, the second registers, and the calculators are all the same, and bit widths of the first registers and the second registers are the same.

In an exemplary embodiment of the present disclosure, the number of the second registers is N, where N=⌈number of bits of divisor data/bit width of the second register⌉, and ⌈ ⌉ is round up function.

In an exemplary embodiment of the present disclosure, the calculator includes:

a comparator configured to compare the registered data in each stage of the first registers and the registered data in each stage of the second registers according to the cascade order; and a subtractor configured to perform a subtraction operation on the registered data in all of the first registers and the registered data in all of the second registers when the registered data in the first register circuit is larger than the registered data in the second register circuit, and replace the registered data in the first registers with a difference resulted from the subtraction operation, and meanwhile add one to a lowest bit of the third shift register circuit as the operation result;

wherein when the registered data in the first register circuit is smaller than the registered data in the second register circuit, fills zero to the lowest bit of the third shift register circuit as the operation result.

In an exemplary embodiment of the present disclosure, comparing the registered data in the first registers and the registered data in the second registers according to the cascade order includes:

for the first register and the second register at a stage other than the lowest stage, when the registered data in the first register is equal to the registered data in the second register, comparing, by the comparator of the next lower stage, the registered data in the first register of the next lower stage and the registered data in the second register of the next lower stage.

In an exemplary embodiment of the present disclosure, the first shift register circuit further includes:

a buffer connected to a front end of the first register and configured to receive the dividend data and output data to the first register bit by bit during the operation process;

wherein when the first register receives the data from the buffer, the first register at the highest stage discards the data of the highest bit, and the buffer fills with a zero at the lowest bit after the buffer outputs data to the first register.

In an exemplary embodiment of the present disclosure, the buffer includes a plurality of cascaded buffer registers, and the sum of the bit widths of all the buffer registers is equal to the number of bits of the dividend data.

In an exemplary embodiment of the present disclosure, the shift control circuit is configured to control the buffer register, the first register, and the third register to perform a left shift operation.

In an exemplary embodiment of the present disclosure, the segment divider further includes a sign control circuit connected to the output circuit;

wherein the sign control circuit includes:

a first sign storing subcircuit configured to store a sign of the dividend;

a second sign storing subcircuit configured to store a sign of the divisor; and a sign output subcircuit configured to perform a bit XOR operation on the sign of the dividend and the sign of the divisor, to obtain a sign of the quotient.

In an exemplary embodiment of the present disclosure, the segment divider further includes:

an enabling circuit configured to control the calculation circuit to start working;

an end circuit configured to mark that the segment divider has finished the working;

a reset circuit configured to reset the circuits of the segment divider; and a clock circuit configured to provide a clock signal to the segment divider.

According to one aspect of the present disclosure, there is provided a segment division operation method, applied to the above segment divider. The segment division operation method includes:

comparing, by the calculation circuit, registered data in the first registers and the registered data in the second registers according to the cascade order, to perform a preset operation and generates an operation result according to the comparison result;

controlling, by the shift control circuit, the first shift register circuit and the third shift register circuit to perform a shift operation after each operation result is generated;

accumulating, by the counting circuit, the number of shift operations after each shift operation, and sending an output signal to the output circuit to finish the operation when the accumulation result equals a target number of bits, and when the accumulation result is not equal to the target number of bits, sending a calculation signal to the calculation circuit to continue the operation;

outputting, by the output circuit, a target result when receiving the output signal, wherein the target result includes a quotient, the quotient is the data registered in the third registers cascaded in the third shift register circuit when the output signal is received.

According to one aspect of the present disclosure, there is provided an electronic device including:

a processor; and a memory for storing executable instructions of the processor;

wherein the processor is configured to execute the above segment division operation method by executing the executable instructions.

It should be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the disclosure. Apparently, the accompanying drawings in the following description show merely some embodiments of the present disclosure, and persons of ordinary skill in the art may still derive other drawings from these accompanying drawings without creative efforts.

DETAILED DESCRIPTION

Figure 1:
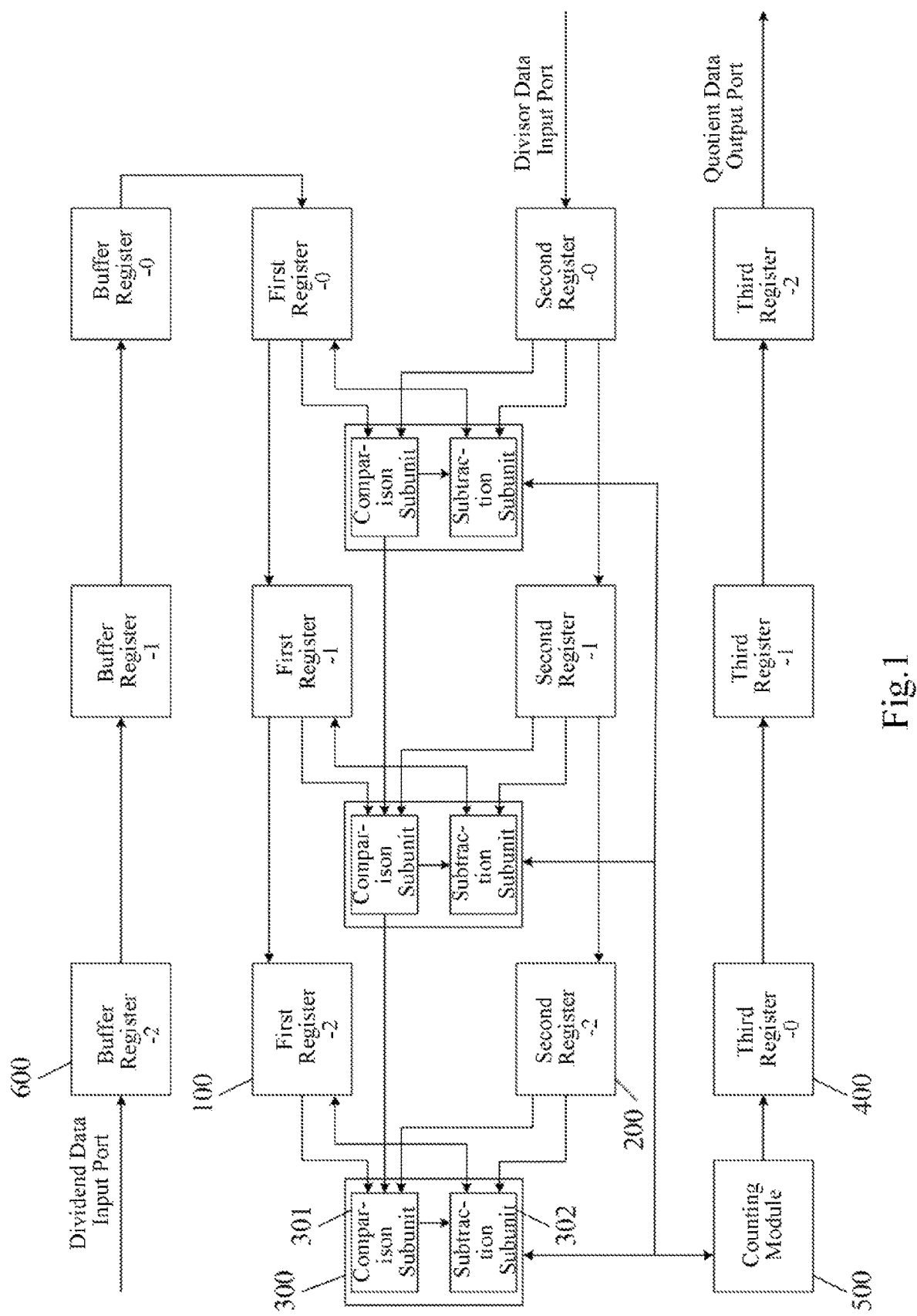
FIG. 1 schematically shows a schematic diagram of an operation architecture of a segment divider in an exemplary embodiment of the present disclosure.

Example embodiments will now be described more fully with reference to the accompanying drawings. However, the exemplary embodiments can be embodied in many forms and should not be construed as limited to the examples set forth herein; rather, these embodiments are provided so that this disclosure will be thorough and complete, and will fully convey the concepts of the exemplary embodiments to those skilled in the art. The features, structures, or features described herein can be combined in any suitable manner in one or more embodiments. In the following description, numerous specific details are given to provide a thorough understanding of embodiments of the present disclosure. However, those skilled in the art will recognize that one or more of the specific details may be practiced, or that other methods, components, steps, etc., may be employed without resorting to the details of the present disclosure. In other instances, well-known solutions may not be shown or described in detail to avoid obscuring aspects of the present disclosure.

In addition, the drawings are merely schematic representations of the present disclosure and are not necessarily drawn to scale. The thickness and shape of the various layers in the figures do not reflect the true scale, but are merely for illustrative purposes of the disclosure. The same reference numerals in the drawings denote the same or similar parts, and a repetitive description thereof will be omitted.

For division operation, the bit width of the operand will have a direct impact on the highest frequency supported by the divider circuitry. The inventor has found that when the bit width of the operand is relatively small (for example smaller than 64 bits), the increase of the bit width of the operand has less effect on the highest frequency supported by the divider circuitry, and generally will not have significant effect on the frequency of the divider circuitry. However, when the bit width of the operand is relatively large (for example more than 64 bits and even more than 120 bits), the increase of the bit width of the operand will have significant effect on the highest frequency supported by the divider circuitry. For example, based on an Altera Cyclone IV FPGA (Field-Programmable Gate Array) chip, for a shift-comparison-subtraction algorithm based divider with a relatively small delay, the frequency supported for the bit width of 32 bits may be up to 160 MHz. While for the divider circuit based on the same algorithm and of the same structure, when the bit width of the operand is increased to 120 bits, the frequency supported will be reduced to 80 MHz or below.

The present exemplary embodiment provides a segment divider, as shown in FIG. 1, the segment divider may include:

a first shift register circuit including a plurality of cascaded first registers 100, and configured to receive data of a dividend (for short, dividend data) bit by bit;

a second shift register circuit including a plurality of cascaded second registers 200, and configured to receive and store data of a data (for short, divisor data);

a calculation circuit including a plurality of cascaded calculators 300, the calculator 300 being configured to compare the registered data in the first register 100 and the registered data in the second register 200 according to the cascade order, to perform a preset operation and generate an operation result according to the comparison result;

a third shift register circuit including a plurality of cascaded third registers 400, and configured to receive and register the operation result bit by bit;

a shift control circuit configured to control the first shift register circuit and the third shift register circuit to perform a shift operation after each operation result is generated;

a counting circuit 500 configured to accumulate the number of shift operations after each shift operation, and send an output signal to the output circuit to finish the operation when the accumulation result equals a target number of bits, and when the accumulation result is not equal to the target number of bits, send a calculation signal to the calculation circuit to continue the operation; and an output circuit configured to output a target result when receiving the output signal, wherein the target result includes a quotient, the quotient is the data registered in the third registers 400 cascaded in the third shift register circuit when the output signal is received.

It should be noted that the dividend data and the divisor data refer to data portions other than the positive sign or negative sign in the dividend and the divisor.

In this exemplary embodiment, when the target number of bits is equal to the number of bits of the dividend data, the target result may further include a remainder. The remainder is registered data in the first registers 100 cascaded in the first shift register circuit when the output signal is received.

In the segment divider provided by an exemplary embodiment of the present disclosure, each of the dividend, the divisor, and the quotient is divided by a way of dividing the operands, and is stored segment by segment in cascaded shift registers. Thus, in the operation process, the division operation function with operands of a large bit width may be realized by simple operations of shift, comparison and subtraction operations and so on segment by segment according to the cascade order. In addition, it can significantly improve the highest frequency supported by the divider circuit.

In this exemplary embodiment, the numbers of the first registers 100, the second registers 200, and the calculators 300 are all the same, and the bit widths of the first registers 100 and the second registers 200 are also the same, so as to ensure the operation of data of the same bit width.

The number N of the second registers 200 may be determined according to the number of bits of the divisor data and the bit width of the second register 200. That is, N=⌈ number of bits of divisor data/bit width of the second register⌉, ⌈ ⌉ is round up function. For example, when the number of the divisor data is 12 bits and the bit width of the second register 200 is 4 bits, the number of the second registers 200 required is three. For another example, when the number of bits of the divisor data is 14 bits, and the bit width of the second register 200 is 4 bits, the number of the second registers 200 required is still three.

In view of the complexity of the circuit layout of the divider, the number of the first registers 100 and the second registers 200 may be set to two to four in this embodiment so as to simplify the circuit structure of the divider. Based on this, in the present embodiment, the bit width may also be adjusted according to the set number of registers, to obtain the best match between the bit width of the register and the number of the registers.

In this exemplary embodiment, the segment divider may further include a sign control circuit connected to the output circuit. The sign control circuit may include a first sign storing subcircuit configured to store a sign bit of the dividend, a second sign storing subcircuit configured to store a sign bit of the divisor, and a sign output subcircuit configured to store a sign bit of the quotient. The sign of the quotient may be obtained from bit XOR operation on the sign of the dividend and the sign of the divisor.

The segment divider provided by the present exemplary embodiment is explained in detail below with reference to the accompanying drawings.

Referring to FIG. 1, the first shift register circuit being configured to receive dividend data bit by bit means that the first shift register circuit only receives a shift of one bit of the dividend data in each calculation period, and as the calculation period increases, the number of bits of the dividend data received by the shift register circuit increases. That is to say, the dividend data is not directly input to the first shift register circuit, but rather registered in the first shift register circuit by shift bit by bit during the operation process. For example, the dividend data of 162 bits will be fully loaded in the first shift register circuit after 162 shifts.

Based on this, as shown in FIG. 1, the first shift register circuit may further include a buffer connected to the front end of the first register 100. The buffer may be configured to receive the dividend data and output data to the first register 100 bit by bit during the operation process, to realize transfer of the dividend data bit by bit. When the first register 100 receives the data from the buffer, the first register 100 at the highest stage will discard the data of the highest bit, and the buffer may fill with a zero at the lowest bit after the buffer outputs data to the first register 100. In this embodiment, the buffer may include a plurality of cascaded buffer registers 600, the bit width of each buffer register 600 is the same as the bit width of the first register 100, and the sum of the bit widths of all the buffer registers 600 is equal to the number of bits of the dividend data. It should be noted that, in this embodiment, the number of the buffer registers 600 may be set as the same as or different from that of the first register 100. For example, the buffer may only include one buffer register 600, and the bit width of the buffer register 600 is equal to the number of bits of the dividend data.

Referring to FIG. 1, the second shift register circuit being configured to receive and store divisor data means that the second shift register circuit receives and stores the complete divisor data at the beginning of the operation. For example, divisor data of 162 bits is stored in the second shift register circuit during the entire operation process.

Referring to FIG. 1, the third shift register circuit being configured to receive and register the operation result bit by bit means that since the dividend data is loaded bit by bit, the operation result obtained each time is only an operation result based on the dividend data currently loaded and the divisor data, and the operation result will be shifted at the same time with the shift of the dividend data every time a shift operation is performed.

Based on the above description, the shift control circuit may control the first shift register circuit and the third shift register circuit to perform a shift operation every time an operation result is generated. Specifically, the shift control circuit may control left shift operation of the buffer registers 600, the first registers 100 and the third registers 400. The left shift operation specifically may include left shift of the data (for example, the data inside the same register is shifted along the direction to the highest bit, or the between the cascaded registers, data at the highest bit of a lower stage register is shifted to the lowest bit of the higher register), or abandonment of the highest bit and zero padding of the lowest bit. Thus, every time each operation result is generated, the dividend data and the operation result may be shifted to a higher bit, so as to facilitate the division of the next calculation cycle.

In this exemplary embodiment, the output circuit is configured to output a target result when receiving the output signal. The target result may include a quotient, and when the target number of bits is equal to the number of bits of the dividend data, target the result may further include a remainder.

The quotient may have the same number of bits as the number of bits of the dividend data or as the number of bits of the divisor data. However, since the final operation result may contain both an integer number and a decimal number, the actual number of bits of the target result not only includes the number of bits of the integer part of the quotient, but also includes number of bits of the decimal part of the quotient. Therefore, the actual number of bits is greater than the number of bits of the dividend data and the number of bits of the divisor data. For example, each of the dividend data and the divisor data is 162 bits, and the target number of bits is greater than the number of bits of dividend data, and is for example 180 bits. The target result is 180 bits, of which the integer part is the former 162 bits of data, and the decimal part is the latter 18 bits of data.

In this exemplary embodiment, as shown in FIG. 1, the calculation circuit includes a plurality of cascaded calculators 300. The calculator 300 is configured to compare the registered data in the first register 100 and the registered data in the second register 200 according to the cascade order, to perform a preset operation and generate an operation result according to the comparison result.

Since the first registers 100, the second registers 200, and the calculators 300 are all of a cascaded structure, the calculators 300 are connected to the first registers 100 and the second registers 200 of the same stage. Thus, the calculators 300 may compare the registered data in the first registers 100 and the registered data in the second registers 200 stage by stage in an order from the highest stage to the lowest stage (that is, from the highest bit to the lowest bit). For example, first, the calculator 300 at the highest stage compare the registered data in the first register 100 at the highest stage and the registered data in the second registers 200 at the highest stage, and then, according to the comparison result, the calculator 300 at the next lower stage is instructed to compare the registered data in the first register 100 at the next lower stage and the registered data in the second registers 200 at the next lower stage, and so on. It should be noted that, after the calculator 300 at the current stage completes data comparison, whether the calculator 300 at the next lower stage operates depends on the comparison result of the current stage. Based on this, the next operation is instructed according to the comparison result of comparing the registered data in the first registers 100 and the registered data in the second registers 200 by the calculator 300 at the current stage. The next operation may be a subtraction operation of the current stage data, a comparison operation of the next stage of data, or no operation, etc. Meanwhile, based on the comparison result, according to the comparison result, a current operation result of 0 or 1 may also be generated.

Referring to FIG. 1, the calculating unit 300 may specifically include a comparator 301 and a subtractor 302.

The comparator 301 is configured to compare the registered data in the first register 100 and the registered data in the second register 200 according to the cascade order, to generate a comparison result.

The subtractor 302 is configured to perform a subtraction operation on the registered data in all of the first registers 100 and the registered data in all of the second registers 200 when the registered data in the first registers 100 is larger than the registered data in the second registers 200, and substitute the registered data in the first registers 100 with the resulted difference of the subtraction operation, and meanwhile add 1 to the lowest bit of the third shift register circuit as the operation result.

When the registered data in the first registers 100 is smaller than the registered data in the second registers 200, add 0 to the lowest bit of the third shift register circuit as the operation result.

Based on this, comparing the registered data in the first registers 100 and the registered data in the second registers 200 according to the cascade order may include: for the first register 100 and the second register 200 at a stage other than the lowest stage, when the registered data in the first register 100 is equal to the registered data in the second register 200, comparing, by the comparator 301 of the next lower stage, the registered data in the first register 100 of the next lower stage and the registered data in the second register 200 of the next lower stage.

Figure 2:
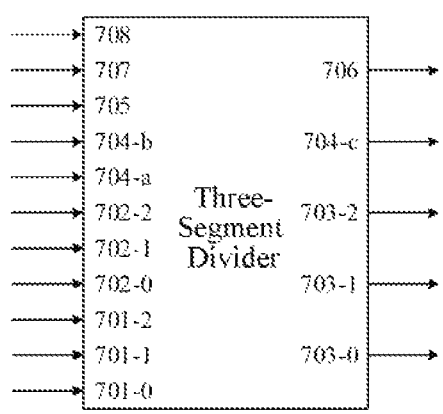
FIG. 2 schematically shows a schematic diagram of top-level circuits of a segment divider in an exemplary embodiment of the present disclosure.

FIG. 2 schematically shows a schematic diagram of top-level circuits of a segment divider in an exemplary embodiment of the present disclosure. Referring to FIG. 2, the segment divider may include:

a plurality of dividend data input ports 701 (701-0, 701-1 and 701-2), each of the dividend data input ports being connectable to a corresponding buffer register 600;

a plurality of divisor data input ports 702 (702-0, 702-1 and 702-2), each of the divisor data input ports being connectable to a corresponding second register 200;

a plurality of quotient data output ports 703 (703-0, 703-1 and 703-2), each of the quotient data output ports being connectable to a corresponding third register 400;

a dividend sign input port 704-a connected to the first sign storing subcircuit configured to store the sign bit of the dividend;

a divisor sign input port 704-b connected to a second sign storing subcircuit configured to store the sign bit of the divisor;

a quotient output port 704-c connected to a sign output subcircuit for storing the sign bit of the quotient;

an enabling signal terminal 705 connected to an enabling circuit configured to control the calculation circuit to start working;

an end signal terminal 706 connected to an end circuit configured to mark that the segment divider has finished the working;

a reset signal terminal 707 connected to a reset circuit configured to reset the circuits of the segment divider; and a clock signal terminal 708 connected to a clock circuit configured to provide a clock signal to the segment divider.

The working process of the segment divider will be exemplarily described below with reference to the accompanying drawings. Taking the three-segment divider shown in FIG. 1 as an example, the first shift register circuit includes three cascaded first registers 100; the second shift register circuit includes three cascaded second registers 200; the third shift register circuit includes three cascaded third registers 400; and the calculation circuit includes three cascaded calculators 300 and each of the calculators 300 includes a comparator 301 and a subtractor 302. Taking the dividend being 3017 in decimal, the divisor being 177 in decimal, and the operands having a bit width of 12 bits as an example, Table 1 shows decimal and binary values of the 12-bit wide dividend and divisor.

TABLE 1

| 12 bit Wide Operands | Decimal Value | Binary Value |
| --- | --- | --- |
| Dividend Data | 3017 | 1011 1100 1001 |
| Divisor Data | 177 | 0000 1011 0001 |

Figure 3:
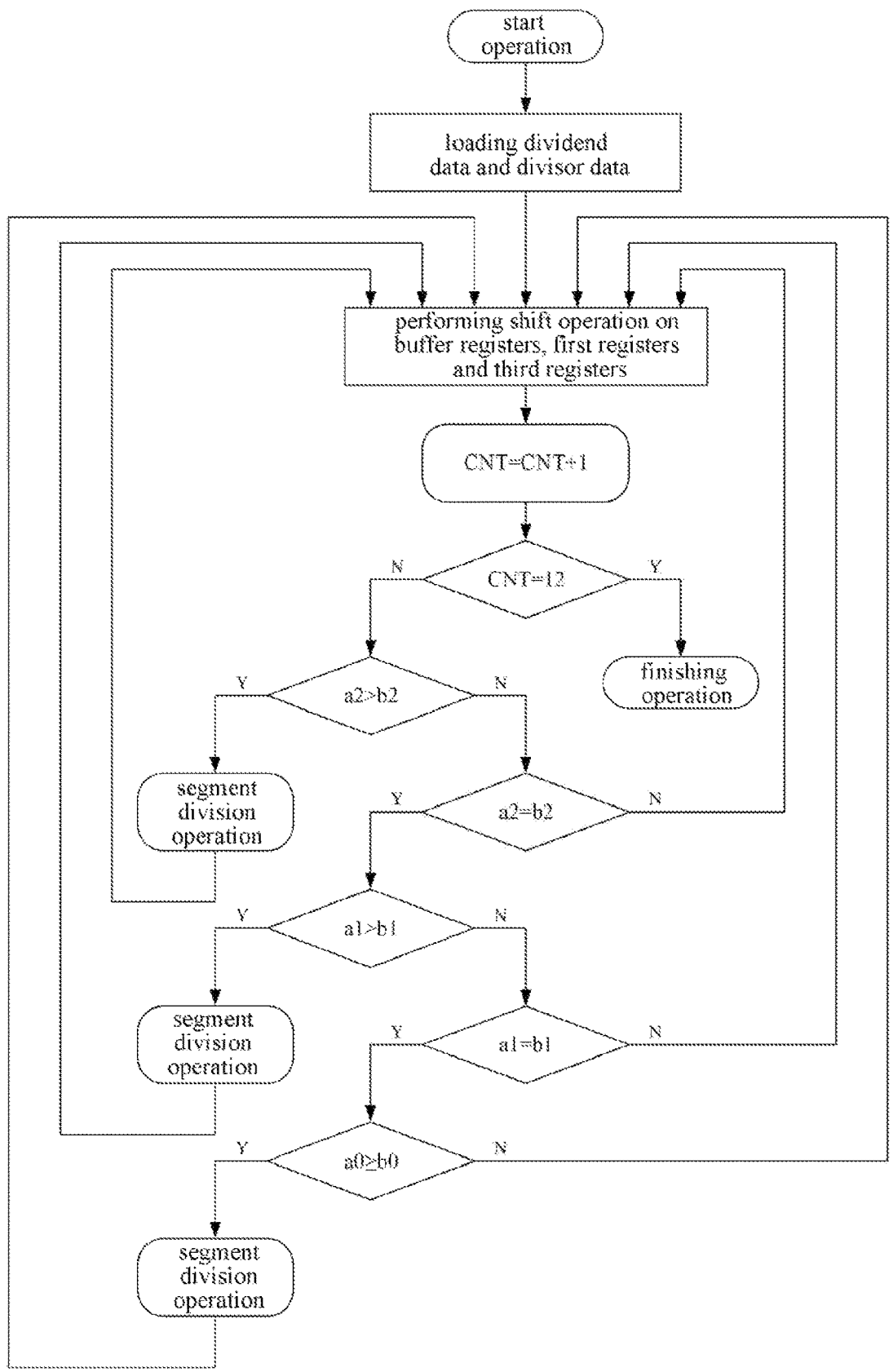
FIG. 3 schematically shows a flowchart of a segment divider in an exemplary embodiment of the present disclosure.

Based on this, the working process of the segment divider is shown in FIG. 3.

In the first phase, the dividend data and divisor data are loaded synchronously. That is, the dividend data and the divisor data are synchronously loaded into the buffer register 600 and the second register 200, respectively, under the control of the enable signal. Table 2 shows the result of loading dividend data and divisor data. The buffer register 0 represents the buffer register of the $0^{th}$ stage (i.e., the lowest stage), the buffer register 1 represents the buffer register of the first stage (i.e., the middle stage), and the buffer register 2 represents the buffer register of the second stage (i.e., the highest stage). The second register 0 represents the second register of the $0^{th}$ stage (i.e., the lowest stage), the second register 1 represents the second register of the first stage (i.e., the middle stage), and the second register 2 represents the second register of the second stage (i.e., the highest stage).

TABLE 2

| Dividend Data | | |
| --- | --- | --- |
| Buffer Register 2 | Buffer Register 1 | Buffer Register 0 |
| 1011 | 1100 | 1001 |
| Divisor Data | | |
| Second Register 2 | Second Register 1 | Second Register 0 |
| 0000 | 1011 | 0001 |

In the second phase, the division operation is performed based on segment shift, comparison operation and subtraction operation.

The second phase may be divided into 12 steps, and each of the steps takes 4 clock cycles to complete.

In Step 1, as shown in FIG. 3, the buffer register 600, the first register 100 and the third register 400 are first shifted synchronously in the first clock cycle, and the number of shift operations is accumulated and then the shifted data is calculated in three clock cycles. For example, in the second clock cycle, the data at the highest-stage is subject to comparison operation (such as a2 and b2 are compared) and then is subject to subtraction operation or other operation according to the comparison result. In the third clock cycle, the data in the middle stage is subject to comparison operation (such as a1 and b1 are compared) and then is subject to subtraction operation or other operation according to the comparison result. In the fourth clock cycle, the data in the lowest stage is subject to comparison operation (such as a0 and b0 are compared) and then is subject to subtraction operation or the present step is finished to proceed to the next step according to the comparison result.

Specifically, the highest-bit data of the buffer register 600 is shifted to the lowest bit of the first register 100 of the lowest stage. At this time, all the data in the buffer registers 600 as a whole is shifted by 1 bit to the upper bit and the lowest bit is padded with 0. At the same time, the data in each of the first registers 100 as a whole is shifted by 1 bit to the upper bit. Between these cascaded registers, the highest-bit data of the first register 100 at a lower stage is shifted to the lowest bit of the first register 100 at a higher stage, and the highest bit of the first register 100 at the highest stage is discarded. The data in each of the third registers 400 as a whole is shifted by 1 bit to the upper bit. Between these cascaded registers, the highest-bit data of the third register 400 at a lower stage is shifted to the lowest bit of the third register 400 at a higher stage, and the highest bit of the third register 400 at the highest stage is discarded.

After shifting, the data in the first registers 100 and the data in the second registers 200 are compared, and according to the comparison result, a subtraction operation is performed, or a comparison operation on next-stage data is performed, or the process directly proceeds to the next step without any operation. For example, referring to FIG. 3, through comparing the data in the first register 100 at the highest stage and the data in the second register 200 at the highest stage by the comparator 301 at the highest stage, when the data in the register 100 at the highest stage is larger than the data in the second register 200 at the highest stage, a subtraction operation is performed on the data in all of the first registers 100 and the data in all of the second registers 200, and generate 1 as the current operation result. When the data in the register 100 at the highest stage is equal to the data in the second register 200 at the highest stage, comparison operation of the comparator 301 at the next lower stage is performed. When the data in the register 100 at the highest stage is smaller than the data in the second register 200 at the highest stage, no operation is performed and the process directly proceeds to the next step.

It should be noted that, in this embodiment, it is also possible to compare the data in the first registers 100 and the data in the second registers 200 at the same time to determine relative numerical relationship between the data in the first shift register circuit and the data in the second shift register circuit according to the comparison result. For example, if the data in the first shift register circuit is larger than or equal to the data in the second shift register circuit, a segmental three-step (corresponding to three stages of registers) subtraction operation may be performed with three clock cycles. The result of the subtraction of each segment of subtraction is used to replace the data in the first register 100 of the segment, and 1 is added to the lowest bit of the third shift register circuit. If the data in the first shift register circuit is smaller than the data in the second shift register circuit, the process directly proceeds to the next step.

In this embodiment, since according to the comparison result of this step, the data in the first shift register circuit is smaller than the data in the second shift register circuit, there is no need to perform a subtraction operation, and the process proceeds directly to the next step. Table 3 shows the data in each register after the first shift operation and comparison operation. The first register 0 represents the first register of the $0^{th}$ stage (i.e., the lowest stage), the first register 1 represents the first register of the first stage (i.e., the middle stage), and the first register 2 represents the first register of the second stage (i.e., the highest stage). The third register 0 represents the third register of the $0^{th}$ stage (i.e., the lowest stage), the third register 1 represents the third register of the first stage (i.e., the middle stage), and the third register 2 represents the third register of the second stage (i.e., the highest stage).

TABLE 3

| Buffer Register | | |
| --- | --- | --- |
| Buffer Register 2 | Buffer Register 1 | Buffer Register 0 |
| 0111 | 1001 | 0010 |
| First Register | | |
| First Register 2 | First Register 1 | First Register 0 |
| 0000 | 0000 | 0001 |
| Second Register | | |
| Second Register 2 | Second Register 1 | Second Register 0 |
| 0000 | 1011 | 0001 |
| Third Register | | |
| Third Register 2 | Third Register 1 | Third Register 0 |
| 0000 | 0000 | 0000 |

In Step 2, as shown in FIG. 3, the specific process is similar to Step 1, and details are not described herein again.

In this embodiment, since according to the comparison result of this step, the data in the first shift register circuit is smaller than the data in the second shift register circuit, there is no need to perform subtraction operation, and the process proceeds directly to the next step. Table 4 shows the data in each register after the second shift operation and comparison operation.

TABLE 4

| Buffer Register | | |
| --- | --- | --- |
| Buffer Register 2 | Buffer Register 1 | Buffer Register 0 |
| 1111 | 0010 | 0100 |
| First Register | | |
| First Register 2 | First Register 1 | First Register 0 |
| 0000 | 0000 | 0010 |
| Second Register | | |
| Second Register 2 | Second Register 1 | Second Register 0 |
| 0000 | 1011 | 0001 |
| Third Register | | |
| Third Register 2 | Third Register 1 | Third Register 0 |
| 0000 | 0000 | 0000 |

In Step 3, as shown in FIG. 3, the specific process is similar to Step 1, and details are not described herein again.

In this embodiment, since according to the comparison result of this step, the data in the first shift register circuit is smaller than the data in the second shift register circuit, there is no need to perform subtraction operation, and the process proceeds directly to the next step. Table 5 shows the data in each register after the third shift operation and comparison operation.

TABLE 5

| Buffer Register | | |
| --- | --- | --- |
| Buffer Register 2 | Buffer Register 1 | Buffer Register 0 |
| 1110 | 0100 | 1000 |
| First Register | | |
| First Register 2 | First Register 1 | First Register 0 |
| 0000 | 0000 | 0101 |
| Second Register | | |
| Second Register 2 | Second Register 1 | Second Register 0 |
| 0000 | 1011 | 0001 |
| Third Register | | |
| Third Register 2 | Third Register 1 | Third Register 0 |
| 0000 | 0000 | 0000 |

In Step 4, as shown in FIG. 3, the specific process is similar to Step 1, and details are not described herein again.

In this embodiment, since according to the comparison result of this step, the data in the first shift register circuit is smaller than the data in the second shift register circuit, there is no need to perform subtraction operation, and the process proceeds directly to the next step. Table 6 shows the data in each register after the fourth shift operation and comparison operation.

TABLE 6

| Buffer Register | | |
| --- | --- | --- |
| Buffer Register 2 | Buffer Register 1 | Buffer Register 0 |
| 1100 | 1001 | 0000 |
| First Register | | |
| First Register 2 | First Register 1 | First Register 0 |
| 0000 | 0000 | 1011 |
| Second Register | | |
| Second Register 2 | Second Register 1 | Second Register 0 |
| 0000 | 1011 | 0001 |
| Third Register | | |
| Third Register 2 | Third Register 1 | Third Register 0 |
| 0000 | 0000 | 0000 |

In Step 5, as shown in FIG. 3, the specific process is similar to Step 1, and details are not described herein again.

In this embodiment, since according to the comparison result of this step, the data in the first shift register circuit is smaller than the data in the second shift register circuit, there is no need to perform subtraction operation, and the process proceeds directly to the next step. Table 7 shows the data in each register after the fifth shift operation and comparison operation.

TABLE 7

| Buffer Register | | |
| --- | --- | --- |
| Buffer Register 2 | Buffer Register 1 | Buffer Register 0 |
| 1001 | 0010 | 0000 |
| First Register | | |
| First Register 2 | First Register 1 | First Register 0 |
| 0000 | 0001 | 0111 |
| Second Register | | |
| Second Register 2 | Second Register 1 | Second Register 0 |
| 0000 | 1011 | 0001 |
| Third Register | | |
| Third Register 2 | Third Register 1 | Third Register 0 |
| 0000 | 0000 | 0000 |

In Step 6, as shown in FIG. 3, the specific process is similar to Step 1, and details are not described herein again.

In this embodiment, since according to the comparison result of this step, the data in the first shift register circuit is smaller than the data in the second shift register circuit, there is no need to perform subtraction operation, and the process proceeds directly to the next step. Table 8 shows the data in each register after the sixth shift operation and comparison operation.

TABLE 8

| Buffer Register | | |
| --- | --- | --- |
| Buffer Register 2 | Buffer Register 1 | Buffer Register 0 |
| 0010 | 0100 | 0000 |
| First Register | | |
| First Register 2 | First Register 1 | First Register 0 |
| 0000 | 0010 | 1111 |
| Second Register | | |
| Second Register 2 | Second Register 1 | Second Register 0 |
| 0000 | 1011 | 0001 |
| Third Register | | |
| Third Register 2 | Third Register 1 | Third Register 0 |
| 0000 | 0000 | 0000 |

In Step 7, as shown in FIG. 3, the specific process is similar to Step 1, and details are not described herein again.

In this embodiment, since according to the comparison result of this step, the data in the first shift register circuit is smaller than the data in the second shift register circuit, there is no need to perform subtraction operation, and the process proceeds directly to the next step. Table 9 shows the data in each register after the seventh shift operation and comparison operation.

TABLE 9

| Buffer Register | | |
| --- | --- | --- |
| Buffer Register 2 | Buffer Register 1 | Buffer Register 0 |
| 0100 | 1000 | 0000 |
| First Register | | |
| First Register 2 | First Register 1 | First Register 0 |
| 0000 | 0101 | 1110 |
| Second Register | | |
| Second Register 2 | Second Register 1 | Second Register 0 |
| 0000 | 1011 | 0001 |
| Third Register | | |
| Third Register 2 | Third Register 1 | Third Register 0 |
| 0000 | 0000 | 0000 |

In Step 8, as shown in FIG. 3, the specific process is similar to Step 1, and details are not described herein again.

In this embodiment, since according to the comparison result of this step, the data in the first shift register circuit is larger than the data in the second shift register circuit, before the process proceeds to the next step, a subtraction operation needs to be performed. Table 10 shows the data in each register after the eighth shift operation and comparison operation. Table 11 shows the data in each register after the eighth shift operation, comparison operation and subtraction operation.

TABLE 10

| Buffer Register | | |
| --- | --- | --- |
| Buffer Register 2 | Buffer Register 1 | Buffer Register 0 |
| 1001 | 0000 | 0000 |
| First Register | | |
| First Register 2 | First Register 1 | First Register 0 |
| 0000 | 1011 | 1100 |
| Second Register | | |
| Second Register 2 | Second Register 1 | Second Register 0 |
| 0000 | 1011 | 0001 |
| Third Register | | |
| Third Register 2 | Third Register 1 | Third Register 0 |
| 0000 | 0000 | 0000 |

TABLE 11

| Buffer Register | | |
| --- | --- | --- |
| Buffer Register 2 | Buffer Register 1 | Buffer Register 0 |
| 1001 | 0000 | 0000 |
| First Register | | |
| First Register 2 | First Register 1 | First Register 0 |
| 0000 | 0000 | 1011 |
| Second Register | | |
| Second Register 2 | Second Register 1 | Second Register 0 |
| 0000 | 1011 | 0001 |
| Third Register | | |
| Third Register 2 | Third Register 1 | Third Register 0 |
| 0000 | 0000 | 0001 |

In Step 9, as shown in FIG. 3, the specific process is similar to Step 1, and details are not described herein again.

In this embodiment, since according to the comparison result of this step, the data in the first shift register circuit is smaller than the data in the second shift register circuit, there is no need to perform subtraction operation, and the process proceeds directly to the next step. Table 12 shows the data in each register after the ninth shift operation and comparison operation.

TABLE 12

| Buffer Register | | |
| --- | --- | --- |
| Buffer Register 2 | Buffer Register 1 | Buffer Register 0 |
| 0010 | 0000 | 0000 |
| First Register | | |
| First Register 2 | First Register 1 | First Register 0 |
| 0000 | 0001 | 0111 |
| Second Register | | |
| Second Register 2 | Second Register 1 | Second Register 0 |
| 0000 | 1011 | 0001 |
| Third Register | | |
| Third Register 2 | Third Register 1 | Third Register 0 |
| 0000 | 0000 | 0010 |

In Step 10, as shown in FIG. 3, the specific process is similar to Step 1, and details are not described herein again.

In this embodiment, since according to the comparison result of this step, the data in the first shift register circuit is smaller than the data in the second shift register circuit, there is no need to perform subtraction operation, and the process proceeds directly to the next step. Table 13 shows the data in each register after the tenth shift operation and comparison operation.

TABLE 13

| Buffer Register | | |
| --- | --- | --- |
| Buffer Register 2 | Buffer Register 1 | Buffer Register 0 |
| 0100 | 0000 | 0000 |
| First Register | | |
| First Register 2 | First Register 1 | First Register 0 |
| 0000 | 0010 | 1110 |
| Second Register | | |
| Second Register 2 | Second Register 1 | Second Register 0 |
| 0000 | 1011 | 0001 |
| Third Register | | |
| Third Register 2 | Third Register 1 | Third Register 0 |
| 0000 | 0000 | 0100 |

In Step 11, as shown in FIG. 3, the specific process is similar to Step 1, and details are not described herein again.

In this embodiment, since according to the comparison result of this step, the data in the first shift register circuit is smaller than the data in the second shift register circuit, there is no need to perform subtraction operation, and the process proceeds directly to the next step. Table 14 shows the data in each register after the eleventh shift operation and comparison operation.

TABLE 14

| Buffer Register | | |
| --- | --- | --- |
| Buffer Register 2 | Buffer Register 1 | Buffer Register 0 |
| 1000 | 0000 | 0000 |
| First Register | | |
| First Register 2 | First Register 1 | First Register 0 |
| 0000 | 0101 | 1100 |
| Second Register | | |
| Second Register 2 | Second Register 1 | Second Register 0 |
| 0000 | 1011 | 0001 |
| Third Register | | |
| Third Register 2 | Third Register 1 | Third Register 0 |
| 0000 | 0000 | 1000 |

In Step 12, as shown in FIG. 3, the specific process is similar to Step 1, and details are not described herein again.

In this embodiment, since according to the comparison result of this step, the data in the first shift register circuit is larger than the data in the second shift register circuit, a subtraction operation is to be performed. After the subtraction operation is finished, the accumulation result of the counting circuit 500 is 12. At this time, the end circuit generates a high level voltage for 1 clock cycle, to indicate the end of the operation. Table 15 shows the data in each register after the twelfth shift operation and comparison operation. Table 16 shows the data in each register after the twelfth shift operation, comparison operation and subtraction operation.

TABLE 15

| Buffer Register | | |
| --- | --- | --- |
| Buffer Register 2 | Buffer Register 1 | Buffer Register 0 |
| 0000 | 0000 | 0000 |
| First Register | | |
| First Register 2 | First Register 1 | First Register 0 |
| 0000 | 1011 | 1001 |
| Second Register | | |
| Second Register 2 | Second Register 1 | Second Register 0 |
| 0000 | 1011 | 0001 |
| Third Register | | |
| Third Register 2 | Third Register 1 | Third Register 0 |
| 0000 | 0000 | 1000 |

TABLE 16

| Buffer Register | | |
| --- | --- | --- |
| Buffer Register 2 | Buffer Register 1 | Buffer Register 0 |
| 0000 | 0000 | 0000 |
| First Register | | |
| First Register 2 | First Register 1 | First Register 0 |
| 0000 | 0000 | 1000 |
| Second Register | | |
| Second Register 2 | Second Register 1 | Second Register 0 |
| 0000 | 1011 | 0001 |
| Third Register | | |
| Third Register 2 | Third Register 1 | Third Register 0 |
| 0000 | 0001 | 0001 |

After the above 12 steps of shift operations, comparison operations and subtraction operations, the segmental division operation provided by the exemplary embodiment may be realized, and the obtained target result is:

the quotient={0000 0001 0001}, that is, 17 in decimal;
the remainder={0000 0000 1000}, that is, 8 in decimal.

In according to one embodiment, the shift control circuit, counting circuit, output circuit, sign control circuit, first sign storing subcircuit, second sign storing subcircuit, output subcircuit may be implemented with corresponding prior components according to the arrangement of the relationship in function and time sequence provided by the present disclosure.

Figure 4:
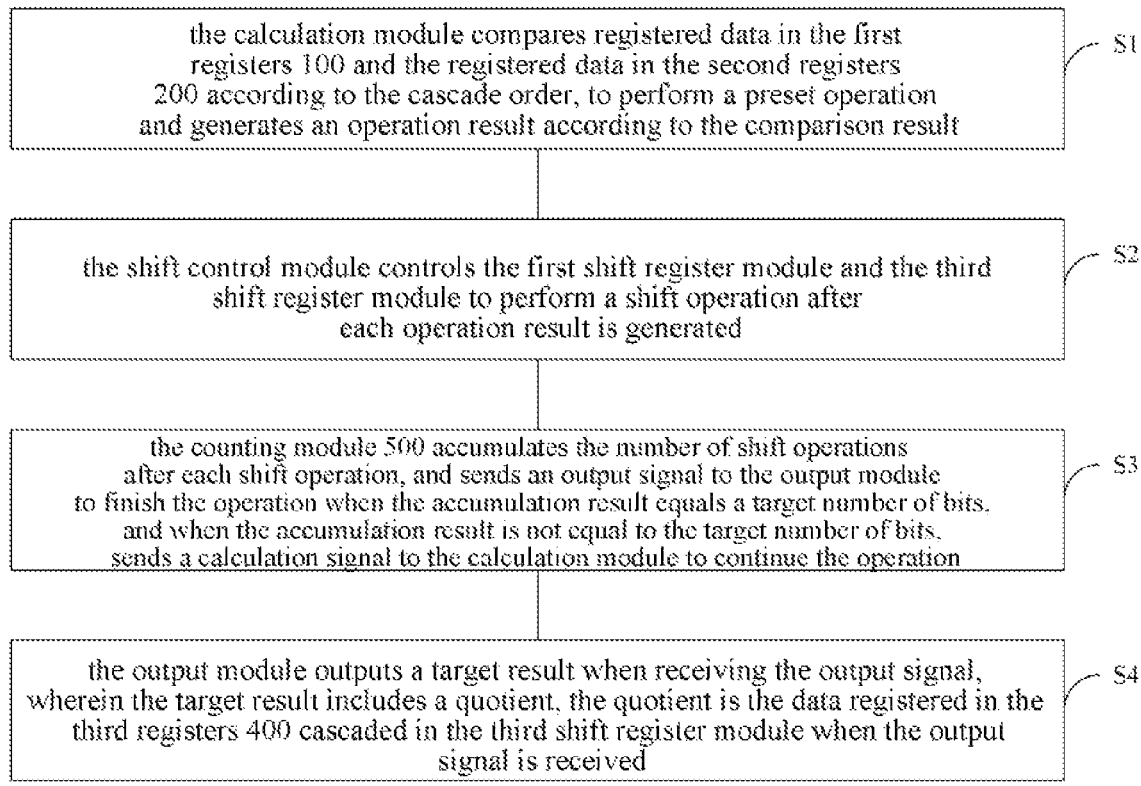
FIG. 4 schematically shows a flowchart of a segment division operation method in an exemplary embodiment of the present disclosure.

An exemplary embodiment also provides a segment division operation method, which is applied to the above division divider. As shown in FIG. 4, the segment division operation method may include the following steps.

In step S1, the calculation circuit compares registered data in the first registers 100 and the registered data in the second registers 200 according to the cascade order, to perform a preset operation and generates an operation result according to the comparison result.

In step S2, the shift control circuit controls the first shift register circuit and the third shift register circuit to perform a shift operation after each operation result is generated.

In step S3, the counting circuit 500 accumulates the number of shift operations after each shift operation, and sends an output signal to the output circuit to finish the operation when the accumulation result equals a target number of bits, and when the accumulation result is not equal to the target number of bits, sends a calculation signal to the calculation circuit to continue the operation.

In step S4, the output circuit outputs a target result when receiving the output signal, wherein the target result includes a quotient, the quotient is the data registered in the third registers 400 cascaded in the third shift register circuit when the output signal is received.

In the step S4, when the target number of bits is equal to the number of bits of the dividend data, the target result includes the quotient and the remainder. The quotient is the data registered in the third registers 400 cascaded in the third shift register circuit when the output signal is received, and the remainder is the data registered in the first registers 100 cascaded in the first shift register circuit when the output signal is received.

In the segment division operation method provided by the exemplary embodiment of the present disclosure, each of the dividend, the divisor, and the quotient is divided by a way of dividing the operands, and the corresponding operands are segmentally stored in cascaded shift registers. Thus, in the operation process, the division operation function with operands of a large bit width may be realized by simple operations of shift, comparison and subtraction operations segment by segment according to the cascade order. In addition, it can significantly improve the highest frequency supported by the divider circuit.

Figure 5:
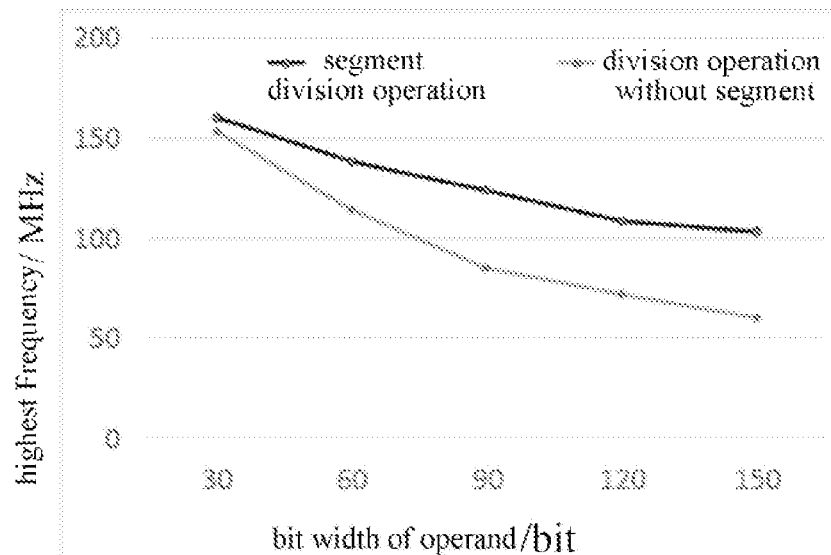
FIG. 5 schematically shows a comparison graph of highest frequencies of a circuit based on an Altera Cyclone IV FPGA chip with a three-segment divider and without a segment divider.
Figure 6:
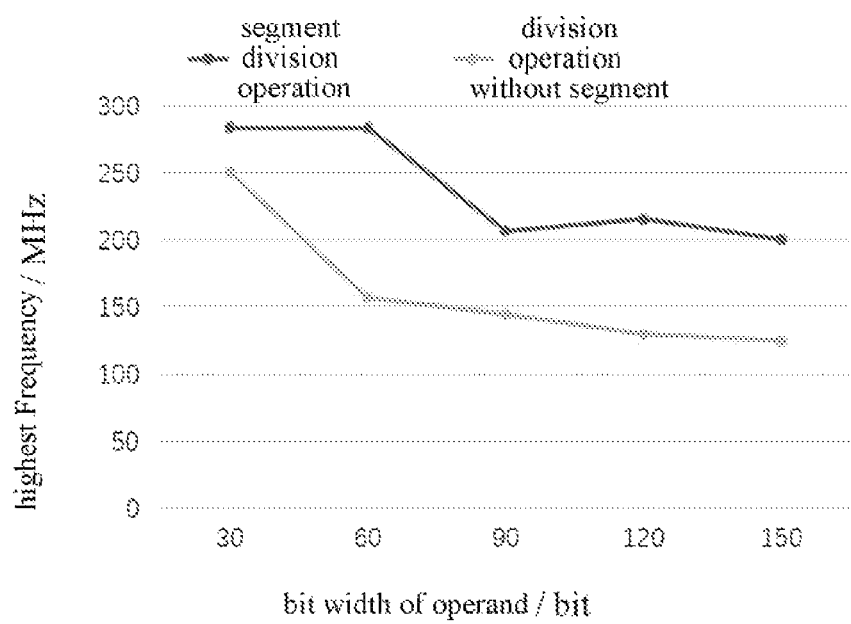
FIG. 6 schematically shows a comparison graph of highest frequencies of a circuit based on an Xilinx Kintex 7 chip with a three-segment divider and without a segment divider.

FIG. 5 and FIG. 6 schematically show comparison graphs of highest frequencies of a circuit with a three-segment divider and without a segment divider, of which FIG. 5 is a comparison result based on an Altera Cyclone IV FPGA (Field-Programmable Gate Array) chip.

As can be seen from FIG. 5, when the bit width of the operand is increased from 30 bits to 150 bits, the highest frequency of the circuit without the segment divider is drastically reduced from 160 MHz to 60 MHz, while the highest frequency of the circuit with the three-segment divider is still larger than 100 MHz. FIG. 6 is a comparison result based on an Xilinx Kintex 7 chip. As can be seen from FIG. 6, when the bit width of the operand is increased from 30 bits to 150 bits, the highest frequency of the circuit without the segment divider is about 120 MHz, while the highest frequency of the circuit with the three-segment divider is still larger than 200 MHz. Based on this, it can be seen that with the segment divider and the segment division operation method, it can significantly improve the highest operating frequency supported by the circuit.

It should be noted that the specific details of the segment division operation method have been described in detail in the description of the corresponding segment divider, which will not be described herein.

The segment divider provided by the exemplary embodiments of the present disclosure is applicable to a division operation with a large bit width, especially for bit width more than 64 bits, for example, in the frontier field of VR (Virtual Reality) or artificial intelligence. Mathematical models in such fields generally have characteristics of a large amount of computing data and a large computing operand, and often involve division operations of large bit-width data, and divider is often most critical part limiting the operating frequencies of the entire hardware circuit system. Based on this, the segment divider provided in this example can significantly improve the highest frequency of the hardware circuit based on the division operation of large operands. Referring to FIG. 5, taking a three-segment divider as an example, based on operands of 162 bit bit width, an operating frequency of 105 MHz is achieved on an Altera Cyclone IV FPGA chip, to meet the requirement that the operating frequency is not lower than 100 MHz for an entire eye tracking hardware system.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the disclosure only be limited by the appended claims.

In an exemplary embodiment of the present disclosure, there is also provided an electronic device capable of implementing the above-mentioned segment division operation method.

Those skilled in the art will understand that various aspects of the present disclosure may be implemented as a system, a method, or a program product. Accordingly, various aspects of the present disclosure may be embodied in the form of an entire hardware embodiment, an entire software embodiment (including firmware, microcode, etc.), or a combination of hardware and software, which may be collectively referred to herein as "circuit", "module", or "system".

The electronic device 800 according to this embodiment of the present disclosure will be described below with reference to FIG. 7. The electronic device 800 shown in FIG. 7 is only an example, and should not impose any limitation on the function and the scope of the application of the embodiments of the present disclosure.

Figure 7:
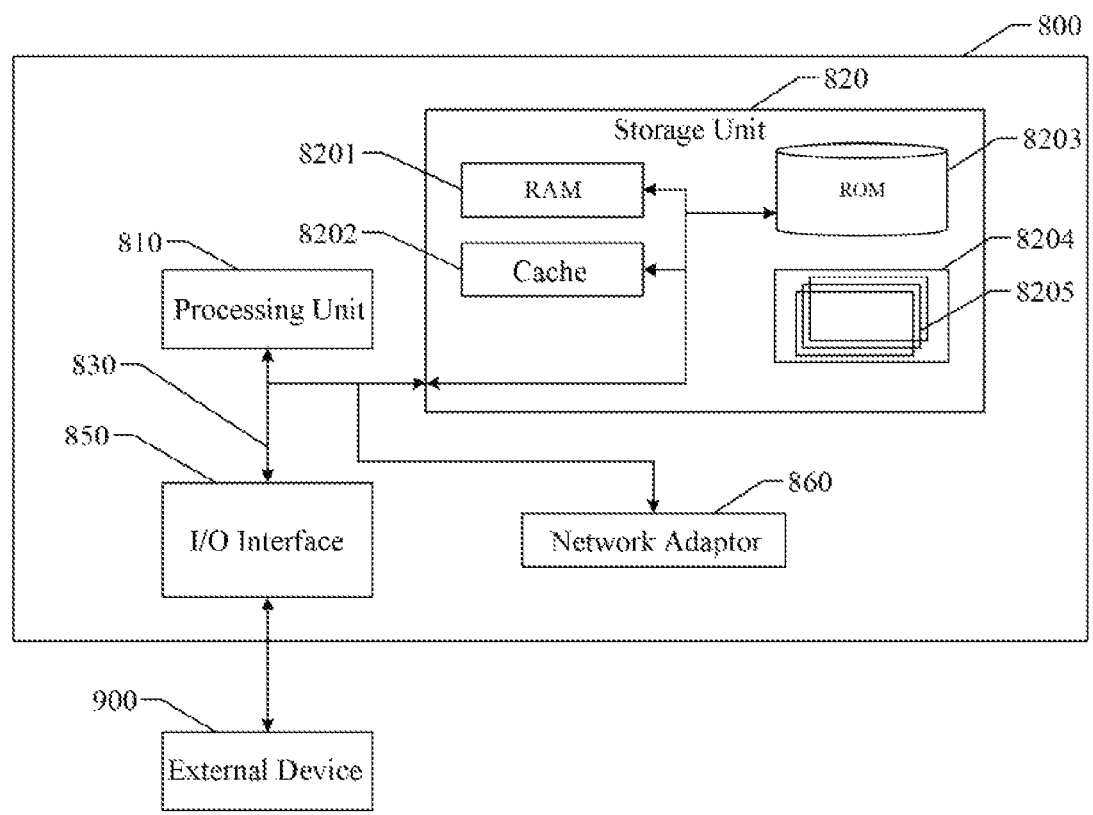
FIG. 7 schematically shows a block diagram of an electronic device in an exemplary embodiment of the present disclosure.

As shown in FIG. 7, the electronic device 800 is represented in the form of a general purpose computing device. The components of the electronic device 800 may include, but are not limited to, the at least one processing unit 810, the at least one storage unit 820, and the bus 830 for connecting the various system components (including the storage unit 820 and the processing unit 810).

The storage unit 820 stores program codes that can be executed by the processing unit 810, such that the processing unit 810 performs the steps according to the various exemplary embodiments of the present disclosure described in the above exemplary method of the present specification. For example, the processing unit 810 may perform the steps as shown in FIG. 4: S1, comparing, by the calculation circuit, registered data in the first registers 100 and the registered data in the second registers 200 according to the cascade order, performing a preset operation and generate an operation result according to the comparison result; S2, controlling, by the shift control circuit, the first shift register circuit and the third shift register circuit to perform a shift operation after each operation result is generated; S3, accumulating, by the counting circuit 500, the number of shift operations after each shift operation, and sending an output signal to the output circuit to finish the operation when the accumulation result equals a target number of bits, and when the accumulation result is not equal to the target number of bits, sending a calculation signal to the calculation circuit to continue the operation; S4, outputting, by the output circuit, a target result when receiving the output signal, wherein the target result includes a quotient and a remainder, the quotient is the data registered in the third registers 400 cascaded in the third shift register circuit when the output signal is received. The remainder is the data registered in the first registers 100 cascaded in the first shift register circuit when the output signal is received.

The storage unit 820 may include a readable medium in the form of a volatile storage unit, such as a random access memory unit (RAM) 8201 and/or a cache memory unit 8202, and may further include a read only memory unit (ROM) 8203.

The storage unit 820 may also include a program/utility 8204 having a set of (at least one) program modules 8205 including, but not limited to, an operating system, one or more applications, other program modules, and program data. Each of these examples or some combination thereof may include an implementation of a network environment.

The bus 830 may represent one or more of several types of bus structures, including a memory cell bus or a memory cell controller, a peripheral bus, a graphics acceleration port, a processing unit, or a local bus employing any of a variety of bus structures.

The electronic device 800 may also communicate with one or more external devices 900 (e.g., keyboards, pointing devices, Bluetooth devices, etc.) and may also communicate with one or more devices that enable users to interact with the electronic device 800, and/or any device (e.g., router, modem, etc.) that enables the electronic device 800 to communicate with one or more other computing devices. Such communication may be performed via an input/output (I/O) interface 850. And, the electronic device 800 may also communicate with one or more networks such as a local area network (LAN), a wide area network (WAN), and/or a public network such as the Internet via the network adapter 880. As shown, a network adapter 880 communicates with other modules of the electronic device 800 over the bus 830. It should be understood that although not shown in the figures, other hardware and/or software modules may be used in connection with the electronic device 800, including, but not limited to, microcode, device drivers, redundant processing units, external disk drive arrays, RAID systems, tape drives as well as data backup storage systems, and so on.

Based on the foregoing description of the embodiments, those skilled in the art can readily understand that the exemplary embodiments described herein may be implemented by software, and may also be implemented by software in combination with necessary hardware. Therefore, the technical solutions according to the embodiments of the present disclosure may be embodied in the form of a software product that can be stored on a non-volatile storage medium (which may be a CD-ROM, a USB flash drive, a removable hard disk, etc.) or a network, includes instructions to enable a computing device (which may be a personal computer, a server, a terminal device, or a network device, etc.) to perform a method according to the embodiment of the present disclosure.

What is claimed is:

1. A segment divider comprising:
a first shift register circuit, comprising a plurality of cascaded first registers and configured to receive data of a dividend bit by bit;
a second shift register circuit, comprising a plurality of cascaded second registers and configured to receive and store data of a divisor;
a calculation circuit, comprising a plurality of cascaded calculators, the calculator being configured to compare the registered data in the first register and the registered data in the second register according to the cascade order, to perform a preset operation and to generate an operation result according the comparison result;
a third shift register circuit, comprising a plurality of cascaded third registers and configured to receive and register the operation result bit by bit;
a shift control circuit, configured to control the first shift register circuit and the third shift register circuit to perform a shift operation after each operation result is generated;
a counting circuit, configured to accumulate a number of the shift operation after each shift operation, and when a result of the accumulation equals a target number of bits, to send an output signal, and when the result of the accumulation is not equal to the target number of bits, to send a calculation signal to the calculation circuit to continue the operation; and
an output circuit, configured to receive the output signal to finish the operation, and to output a target result, wherein the target result comprises a quotient, and the quotient is the data registered in the third shift register circuit when the output signal is received,
wherein the calculator comprises:
a comparator, configured to compare the registered data in each stage of the first registers and the registered data in each stage of the second registers according to the cascade order; and
a subtractor, configured to perform a subtraction operation on the registered data in all of the first registers and the registered data in all of the second registers when the registered data in the first register circuit is larger than the registered data in the second register circuit, and to replace the registered data in the first registers with a difference resulted from the subtraction operation, and meanwhile to add one to a lowest bit of the third shift register circuit as the operation result;
wherein when the registered data in the first register circuit is smaller than the registered data in the second register circuit, filling zero to the lowest bit of the third shift register circuit as the operation result.

2. The segment divider according to claim 1, wherein the first registers, the second registers, and the calculators are same in number, and the first registers and the second registers are same in bit width.

3. The segment divider according to claim 2, wherein a number of the second registers is N, where N=⌈number of bits of the data of the divisor/bit width of the second register⌉, and ⌈ ⌉ is a round up function.

4. The segment divider according to claim 3, wherein when the target number of bits is equal to the number of bits of the data of the dividend, the target result further comprises a remainder, and the remainder is registered data in the first shift register circuit when the output signal is received.

5. The sectional divider according to claim 1, wherein the comparing the registered data in the first registers and the registered data in the second registers according to the cascade order comprises:
for the first registers and the second registers at stages higher than a lowest stage, when the registered data in the first register is equal to the registered data in the second register, comparing, by the comparator of a next lower stage, the registered data in the first register of a next lower stage and the registered data in the second register of a next lower stage.

6. The segment divider according to claim 1, wherein the first shift register circuit further comprises:
a buffer, connected to a front end of the first register and configured to receive the data of the dividend and to output data to the first register bit by bit during the operation;
wherein when the first register receives the data from the buffer, the first register at a highest stage discards data at a highest bit, and the buffer fills with a zero at a lowest bit after the buffer outputs data to the first register.

7. The segment divider according to claim 6, wherein the buffer comprises a plurality of cascaded buffer registers, and a sum of the bit widths of all the buffer registers is equal to a number of bits of the data of the dividend.

8. The segment divider according to claim 7, wherein the shift control circuit is configured to control the buffer registers, the first registers, and the third registers to perform a left shift operation.

9. The segment divider according to claim 1, further comprising a sign control circuit connected to the output circuit;
wherein the sign control circuit comprises:
a first sign storing subcircuit, configured to store a sign of the dividend;
a second sign storing subcircuit, configured to store a sign of the divisor; and
a sign output subcircuit, configured to perform a bit XOR operation on the sign of the dividend and the sign of the divisor, to obtain a sign of the quotient.

10. The segment divider according to claim 1, further comprising:
an enabling circuit, configured to control the calculation circuit to start working;
an end circuit, configured to mark that the segment divider has finished the working;
a reset circuit, configured to reset the circuits of the segment divider; and
a clock circuit, configured to provide a clock signal to the segment divider.

11. A segment division operation method, applied to a segment divider, wherein the segment divider comprises:
a first shift register circuit, comprising a plurality of cascaded first registers and configured to receive data of a dividend bit by bit;
a second shift register circuit, comprising a plurality of cascaded second registers and configured to receive and store data of a divisor;
a calculation circuit, comprising a plurality of cascaded calculators, the calculator being configured to compare the registered data in the first register and the registered data in the second register according to the cascade order, to perform a preset operation and generate an operation result according the comparison result;

a third shift register circuit, comprising a plurality of cascaded third registers and configured to receive and register the operation result bit by bit;

a shift control circuit, configured to control the first shift register circuit and the third shift register circuit to perform a shift operation after each operation result is generated;

a counting circuit, configured to accumulate a number of the shift operation after each shift operation, and when a result of the accumulation equals a target number of bits, to send an output signal, and when the result of the accumulation is not equal to the target number of bits, to send a calculation signal to the calculation circuit to continue the operation; and an output circuit, configured to receive the output signal to finish the operation, and to output a target result, wherein the target result comprises a quotient, and the quotient is the data registered in the third shift register circuit when the output signal is received, and wherein the calculator comprises:

a comparator, configured to compare the registered data in each stage of the first registers and the registered data in each stage of the second registers according to the cascade order; and a subtractor, configured to perform a subtraction operation on the registered data in all of the first registers and the registered data in all of the second registers when the registered data in the first register circuit is larger than the registered data in the second register circuit, and to replace the registered data in the first registers with a difference resulted from the subtraction operation, and meanwhile to add one to a lowest bit of the third shift register circuit as the operation result;

wherein when the registered data in the first register circuit is smaller than the registered data in the second register circuit, filling zero to the lowest bit of the third shift register circuit as the operation result, and wherein the segment division operation method comprises:

comparing, by the calculation circuit, registered data in the first registers and the registered data in the second registers according to the cascade order, to perform a preset operation and generates an operation result according to the comparison result;

controlling, by the shift control circuit, the first shift register circuit and the third shift register circuit to perform a shift operation after each operation result is generated;

accumulating, by the counting circuit, the number of shift operations after each shift operation, and sending an output signal to the output circuit to finish the operation when the accumulation result equals a target number of bits, and when the accumulation result is not equal to the target number of bits, sending a calculation signal to the calculation circuit to continue the operation;

outputting, by the output circuit, a target result when receiving the output signal, wherein the target result includes a quotient, the quotient is the data registered in the third registers cascaded in the third shift register circuit when the output signal is received.

12. The segment division operation method according to claim 11, wherein when the target number of bits is equal to the number of bits of the dividend data, the target result comprises a quotient and a remainder, the quotient is the data registered in the third shift register circuit when the output signal is received, and the remainder is the data registered in the first shift register circuit when the output signal is received.

13. An electronic device comprising:

a processor; and a memory for storing executable instructions of the processor;

wherein the processor is configured to execute a segment division operation method by executing the executable instructions, wherein the segment division operation method is applied to a segment divider, the segment divider comprises:

a first shift register circuit, comprising a plurality of cascaded first registers and configured to receive data of a dividend bit by bit;

a second shift register circuit, comprising a plurality of cascaded second registers and configured to receive and store data of a divisor;

a calculation circuit, comprising a plurality of cascaded calculators, the calculator being configured to compare the registered data in the first register and the registered data in the second register according to the cascade order, to perform a preset operation and generate an operation result according the comparison result;

a third shift register circuit, comprising a plurality of cascaded third registers and configured to receive and register the operation result bit by bit;

a shift control circuit, configured to control the first shift register circuit and the third shift register circuit to perform a shift operation after each operation result is generated;

a counting circuit, configured to accumulate a number of the shift operation after each shift operation, and when a result of the accumulation equals a target number of bits, to send an output signal, and when the result of the accumulation is not equal to the target number of bits, to send a calculation signal to the calculation circuit to continue the operation; and an output circuit, configured to receive the output signal to finish the operation, and to output a target result, wherein the target result comprises a quotient, and the quotient is the data registered in the third shift register circuit when the output signal is received, and wherein the calculator comprises:

a comparator, configured to compare the registered data in each stage of the first registers and the registered data in each stage of the second registers according to the cascade order; and a subtractor, configured to perform a subtraction operation on the registered data in all of the first registers and the registered data in all of the second registers when the registered data in the first register circuit is larger than the registered data in the second register circuit, and to replace the registered data in the first registers with a difference resulted from the subtraction operation, and meanwhile to add one to a lowest bit of the third shift register circuit as the operation result;

wherein when the registered data in the first register circuit is smaller than the registered data in the second register circuit, filling zero to the lowest bit of the third shift register circuit as the operation result; and wherein the segment division operation method comprises:

comparing, by the calculation circuit, registered data in the first registers and the registered data in the second registers according to the cascade order, to perform a preset operation and generates an operation result according to the comparison result;

controlling, by the shift control circuit, the first shift register circuit and the third shift register circuit to perform a shift operation after each operation result is generated;

accumulating, by the counting circuit, the number of shift operations after each shift operation, and sending an output signal to the output circuit to finish the operation when the accumulation result equals a target number of bits, and when the accumulation result is not equal to the target number of bits, sending a calculation signal to the calculation circuit to continue the operation;

outputting, by the output circuit, a target result when receiving the output signal, wherein the target result includes a quotient, the quotient is the data registered in the third registers cascaded in the third shift register circuit when the output signal is received.

* * * * *